(12) United States Patent
Förstner et al.

(10) Patent No.: US 7,077,466 B2
(45) Date of Patent: Jul. 18, 2006

(54) LIFEJACKET POUCH

(75) Inventors: Werner Förstner, Untermünkheim (DE); Peter Biernoth, Neckarsulm (DE); Heinz-Gerhard Klein, Michelbach (DE)

(73) Assignee: Recaro Aircraft Seating GmbH & Co., Schawabisch Hall (DE)

( * ) Notice: Subject to any disclaimer, the term of this patent is extended or adjusted under 35 U.S.C. 154(b) by 177 days.

(21) Appl. No.: 10/468,261

(22) PCT Filed: Aug. 22, 2002

(86) PCT No.: PCT/EP02/09368

§ 371 (c)(1),
(2), (4) Date: Aug. 19, 2003

(87) PCT Pub. No.: WO03/024794

PCT Pub. Date: Mar. 27, 2003

(65) Prior Publication Data

US 2004/0066065 A1    Apr. 8, 2004

(30) Foreign Application Priority Data

Aug. 5, 2001  (DE) ............................... 101 43 438

(51) Int. Cl.
*B60N 3/00* (2006.01)
(52) U.S. Cl. .................... 297/188.08; 297/188.13; 383/47; 244/122 R
(58) Field of Classification Search .......... 297/188.08, 297/188.13; 244/122 R; 24/265 BC, 265 EC, 24/302; 224/235, 275, 654; 383/42, 47, 383/86.2
See application file for complete search history.

(56) References Cited

U.S. PATENT DOCUMENTS

| | | | | |
|---|---|---|---|---|
| 437,374 A | * | 9/1890 | Bennett | 249/161 |
| 2,853,219 A | * | 9/1958 | Schwartz | 224/275 |
| 2,931,550 A | * | 4/1960 | Wood | 224/275 |
| 3,014,759 A | * | 12/1961 | Bing | 297/188.06 |
| 3,516,098 A | | 6/1970 | O'Link | |
| 3,623,683 A | | 11/1971 | Bennett | |
| 3,632,029 A | * | 1/1972 | Sonner | 224/275 |
| 4,306,748 A | | 12/1981 | Sullivan | |
| 5,573,288 A | * | 11/1996 | Raffensperger | 297/188.12 |
| 5,927,800 A | * | 7/1999 | Stallworth | 297/188.08 |
| 6,082,816 A | * | 7/2000 | Gottlieb et al. | 297/188.1 |

FOREIGN PATENT DOCUMENTS

| | | |
|---|---|---|
| DE | 19944619 | 4/2001 |
| WO | 8704990 | 8/1987 |

* cited by examiner

*Primary Examiner*—Peter R. Brown
(74) *Attorney, Agent, or Firm*—Roylance, Abrams, Berdo & Goodman, L.L.P.

(57) ABSTRACT

A lifejacket pouch in the form of a pocket (3), is located beneath the seat surface of an aircraft seat. Wall pieces (17) move relative to each other and may be fixed in a position adjacent to each other along an opening edge (7) of the pocket (3). A closure device includes at least a pair of retaining elements to generate a closing force acting between the wall pieces at the opening edge (7). The elements may be overcome by a manually-operated tear-strip (13) for opening the pocket (3), having a tie strip (11), acting on the pair of retaining elements. A combination of a press-stud closure and a tie strip (11) on the tear strip, through which the above extends, offers a high closure security and a possibility of opening particularly simply and rapidly with a good closing force. At least one pair of retaining elements includes a press-stud closure (21, 23). The tie strip (11) has an opening (25) through which the press stud closure (21, 23) extend.

6 Claims, 6 Drawing Sheets

Fig.1    State of the Art

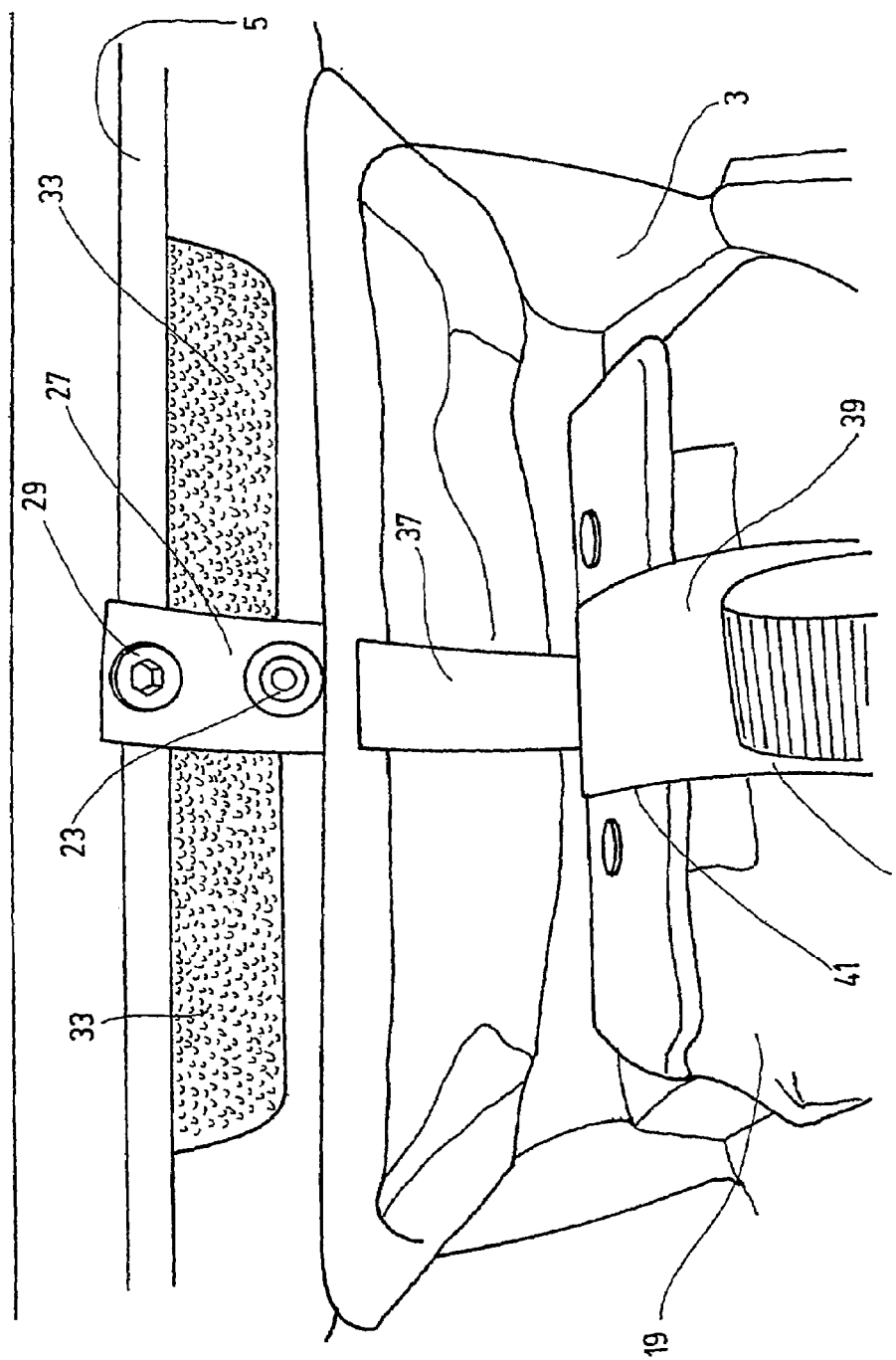

LIFEJACKET POUCH

FIELD OF THE INVENTION

The present invention relates to a life jacket pouch in the form of a pocket located beneath the seat surface. The pocket has wall components which move relative to each other and which may be fixed in position adjacent to each other along an opening edge of the pocket by a closure device. The closure device comprises at least one pair of retaining elements to generate a closing force acting between the wall elements. The closing force may be overcome to open the pocket by a manually operated opening strip having a tie strip acting on the pair of retaining elements.

BACKGROUND OF THE INVENTION

Life jacket pouches are in use throughout the world in aircraft made by the most famous manufacturers. The principal requirements to be set for life jacket pouches are that the opening edge of the pouch be reliably closed under normal conditions so that the life jacket it contains is available for use intact, while allowing the seat occupant to open the closure device rapidly and by especially simple means when the need for use or an emergency arises. Conventional life jacket pouches do not fully meet these requirements. In the current customary design, the closure device has a flat fastener provided on the opening edge of the pouch in the form of a pad and hook strip through which the tear flap extends. While the pouch itself can be rapidly and easily opened when necessary, the closure device does not afford adequate certainty that the pouch will not be opened unintentionally.

DE-A-199 44 619 discloses an aircraft passenger seat with a life jacket being mounted and with upholstery components enhancing seating comfort. The mounting option is represented by at least one upholstery component. The life jacket is designed as an integral component of the respective upholstery component located on the top of the leg rest. The upholstery in question is replaced by the life jacket, so that weight reduction relative to conventional solutions is effected, providing a favorable effect on the payload situation in the aircraft. By simply spreading the seat occupant's legs, the life jacket integrated into the aircraft passenger seat as an upholstery component is rapidly accessible. This solution provides adequate safety from unintentional opening of the folded life jacket, and represents another modern concept of integration of a life jacket into the aircraft passenger seat. Since a leg or foot rest is necessarily provided in this solution, the solution normally applies only to aircraft passenger seats in the first-class or business section.

SUMMARY OF THE INVENTION

Objects of the present invention are to provide a life jacket pocket where the closure device provides adequate safety from unintentional opening of the pouch, while permitting the life jacket pocket to be easily and rapidly opened when necessary.

In the case of a life jacket pocket of this type, the foregoing objects are attained by at least one pair of restraining elements having a press-stud closure and by a tie strip having an opening through which the press-stud closure extends.

The combination of the present invention, having a press-stud closure and a tie strip through which the press-stud of the opening strip extends, provides both the desired reliability of closure because of the closing force made available by the press-stud closure and the possibility of especially simple and rapid opening. Since the press-stud closure extends through an opening in the tie strip, and since the tie strip accordingly is positioned between the interacting half-elements of the press-stud closure, the snap connection of the half-elements when load is applied to the tie strip is definitely guaranteed.

The design of the present invention complies fully with the approval guidelines laid down by the standard world authorities for aviation equipment, such as the FAR, Part 25, issued by the United States FAA.

In an advantageous exemplary embodiment of the present invention, one half-element of the press-stud closure is not rigidly connected to the front spar of the seat extending in the transverse direction, but rather is movably suspended from the spar by being mounted on a mounting link anchored to the spar. A particular additional advantage is derived, since, by the restriction of mobility by the mounting link, reliable opening of the snap connection is guaranteed independently of the direction in which the seat occupant pulls the opening strip. As a result, the life jacket pocket of the present invention also meets criteria of more demanding requirements set by renowned aircraft equipment manufacturers. These requirements include that it be possible to open the closure device with certainty if the seat occupant operating the opening strip pulls the strip in directions which lie within an angular range of at least 90°, specifically 45°, above and 45° below the horizontal plane of the seat. For the movable connection to the spar, the closure device can be easily and reliably opened when the tie strip is pulled in directions over a very wide range of angles, so that rapidity and ease of access to the life jacket are ensured.

In another advantageous exemplary embodiment of the present invention, a wall element of the pouch is mounted in the area of the opening edge of the pouch below the spar. On both sides of the flexible strip supporting the half-element of the press-stud closure, flat adherent elements may be mounted on the spar which form a flat fastening, together with opposite half-elements mounted on the opening edge of the accessible other wall element of the pouch. The retention force of this fastening is designed so that the adherent elements are disengaged when the strap opens the snap connection on the press-stud closure head and the half-elements of the latter are moved away from each other.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 6 is a highly simplified detached perspective view of the life jacket pouch of FIG. 2 when open, with life jacket pack inside the pocket.

DETAILED DESCRIPTION OF THE INVENTION

Figure 1:
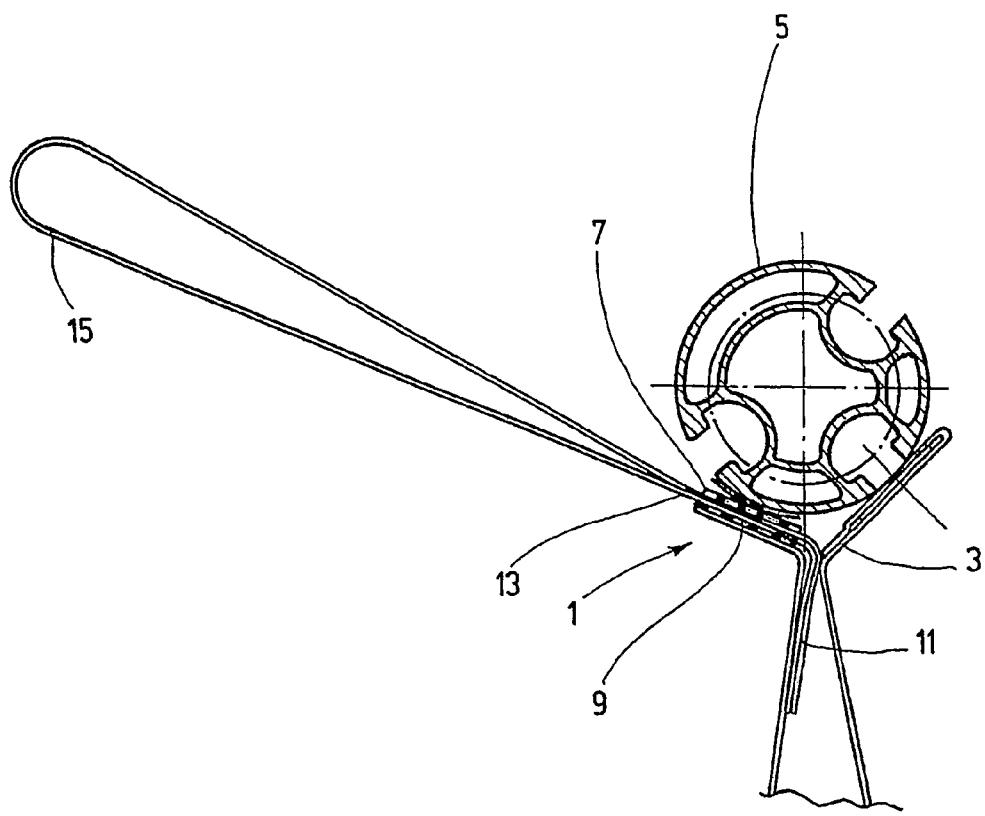
FIG. 1 is a highly simplified, diagrammatic, side elevational view of a conventional life jacket pouch in section mounted below the front spar of a seat.

FIG. 1 shows only the area of a pocket 3 of a closure device 1 of a life jacket pouch corresponding to the state of the art into which the life jacket pack is inserted. The pouch is mounted below a spar 5 in the form of a bracing tube extending in the transverse direction along the front side of an aircraft passenger seat. The pocket 3 is closed along its opening edge 7 by a surface fastener 9 having interacting fastening elements in the form of a padded strip and a hooked strip.

A tie strip 11 of an opening strip has on its free end a grip loop 15 for manual operation by the seat occupant, and extends into the interior of the pocket 3 through the padded strip and hooked strip of the fastener 9. If the opening strip 13 is operated by pulling the grip loop 15, the tie strip 11 of the fastener extending between the fastening elements of the fastener 9, which tie strip 11 is connected inside the pocket 3 to the life jacket pack (not shown), effects lifting of the fastening elements, that is, opening of the pocket 3.

Figure 2:
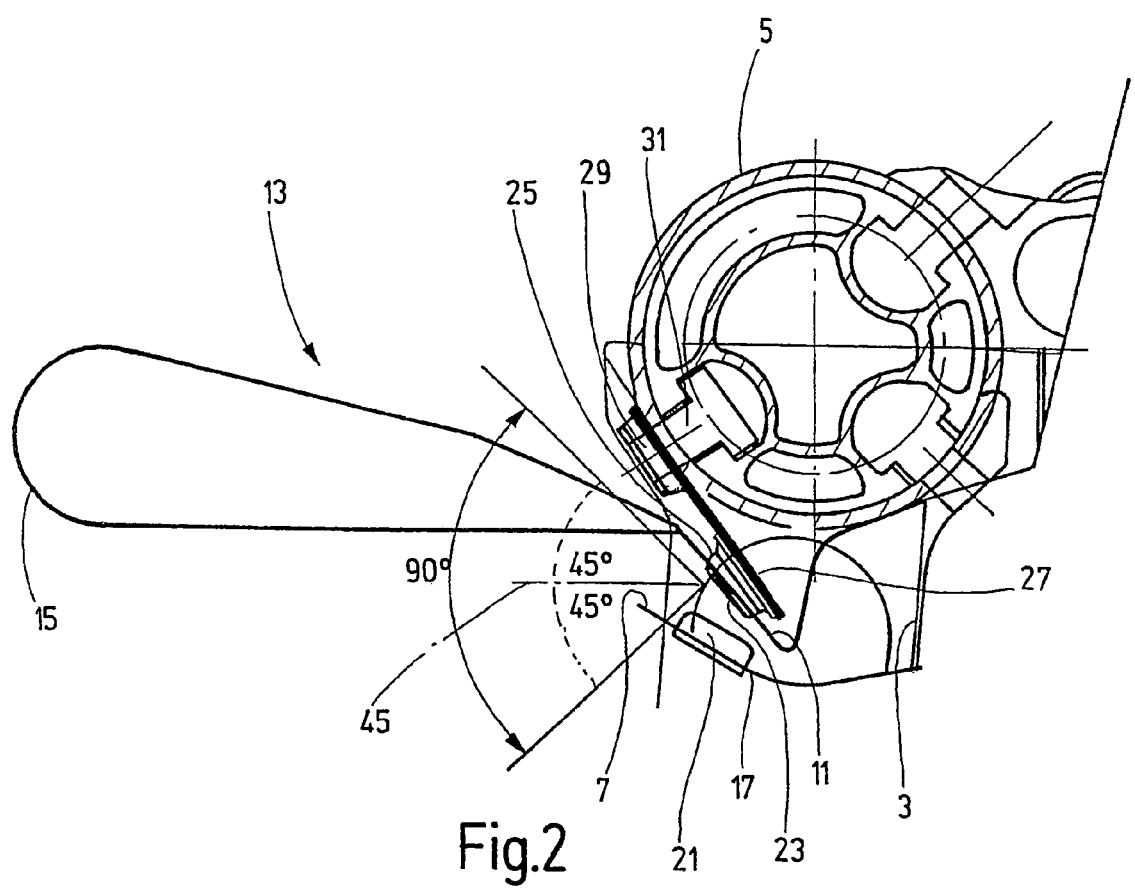
FIG. 2 is a highly simplified diagrammatic, side elevational view of a life jacket pouch according to an embodiment of the present invention, mounted below the front spar of a seat.
Figure 3:
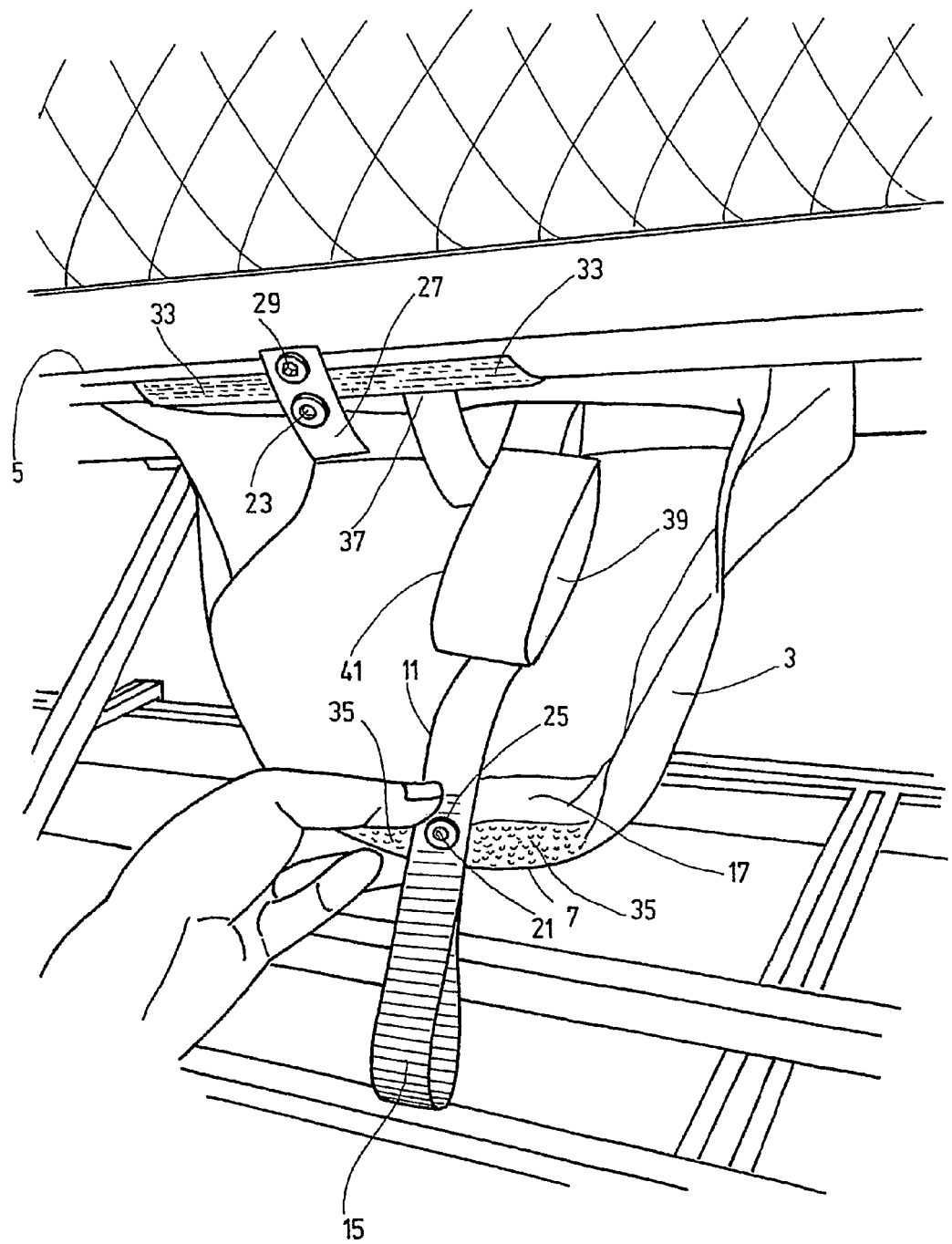
FIG. 3 is a highly simplified perspective view of the life jacket pouch of FIG. 2 when opened, without the life jacket pack in the pocket.

FIG. 2, which covers an area similar to that of FIG. 1 on the spar 5 of an aircraft passenger seat, illustrates the design of one embodiment of the life jacket pouch according to the present invention. FIG. 2 shows the pocket 3 having the flexible wall elements partly opened, but with no life jacket pouch in it. A wall element 17 of the pocket 3, is shown in the drawing positioned below, at the bottom, with its opening edge 7 spaced at a distance from the spar 5. FIG. 3 illustrates a similar situation in which the pocket 3 has been fully opened, and with no life jacket pouch present in the pocket 3. The position of the life jacket pouch 19 in the pocket 3 after opening is shown only in the drawing of FIG. 6.

As is to be seen the most clearly in FIGS. 2 and 3, the closure device of the pocket 3 has, on the opening edge 7, a press-stud fastener with press-stud half-elements 21 and 23 which may be brought together to form a snap connection. The opening strip 13 has, in the transitional area between outer grip loop 15 and tie strip 11, an opening 25 through which extends press-stud fastener 21, 23. FIG. 3, in particular, shows that the press-stud or snap half-element 21 extends through the opening 25 in the tie strip 11. In the illustration in FIG. 2, the tie strip 11 is shown in a position in which the other press-stud or snap half-element 23 extends through the opening 25.

If the pocket 3 on the opening edge 7 is closed, that is, if the bottom wall element 17 supporting the press-stud half-element 21 has been positioned near the spar 5, the press-stud closure is closed by insertion of the half-element 21 into the press-stud half-element 23 suspended from the spar 5. As is to be seen the most clearly in FIGS. 2 and 3, the half-element 23 associated with the spar 5 is not rigidly connected to the spar 5. Rather half-element 23 is suspended from the spar 5 by a retaining strip in the form of a short, flexible strap segment 27. The strap segment 27 is secured by a retaining screw to the spar 5. Spar 5 is in the form of a bracing tube into which an embedded nut 31 (FIG. 2) is inserted and which is engaged by the screw 29.

As seen most clearly in FIGS. 3 to 6, flat retaining elements 33 may be engaged with associated opposite retaining elements 35 on the opening edge 7 of the wall element 17 of the pocket 3 when the pocket 3 is closed. Retaining elements 33 extend from both sides of the point of application of the strap segment 27 on the spar 5.

As best seen in FIGS. 3 to 6, the tie strip 11 is lengthened so as to extend into the interior of the pocket 3 to form a pull-out cord 39 anchored to the inner end 37 for extracting the life jacket pack 19 (FIG. 6). FIG. 3 shows that the pull-out cord 39 forms a coil 41 inside the pocket 3 for encircling the life jacket pack (not shown in FIG. 3), so that the life jacket pack 19 surrounded by the coil 41 is extracted from the pocket 3 when the latter is opened by the tie strip 11 and the pull-out cord 39, by pulling on the grip loop 15 of the opening strip 13.

Figure 4:
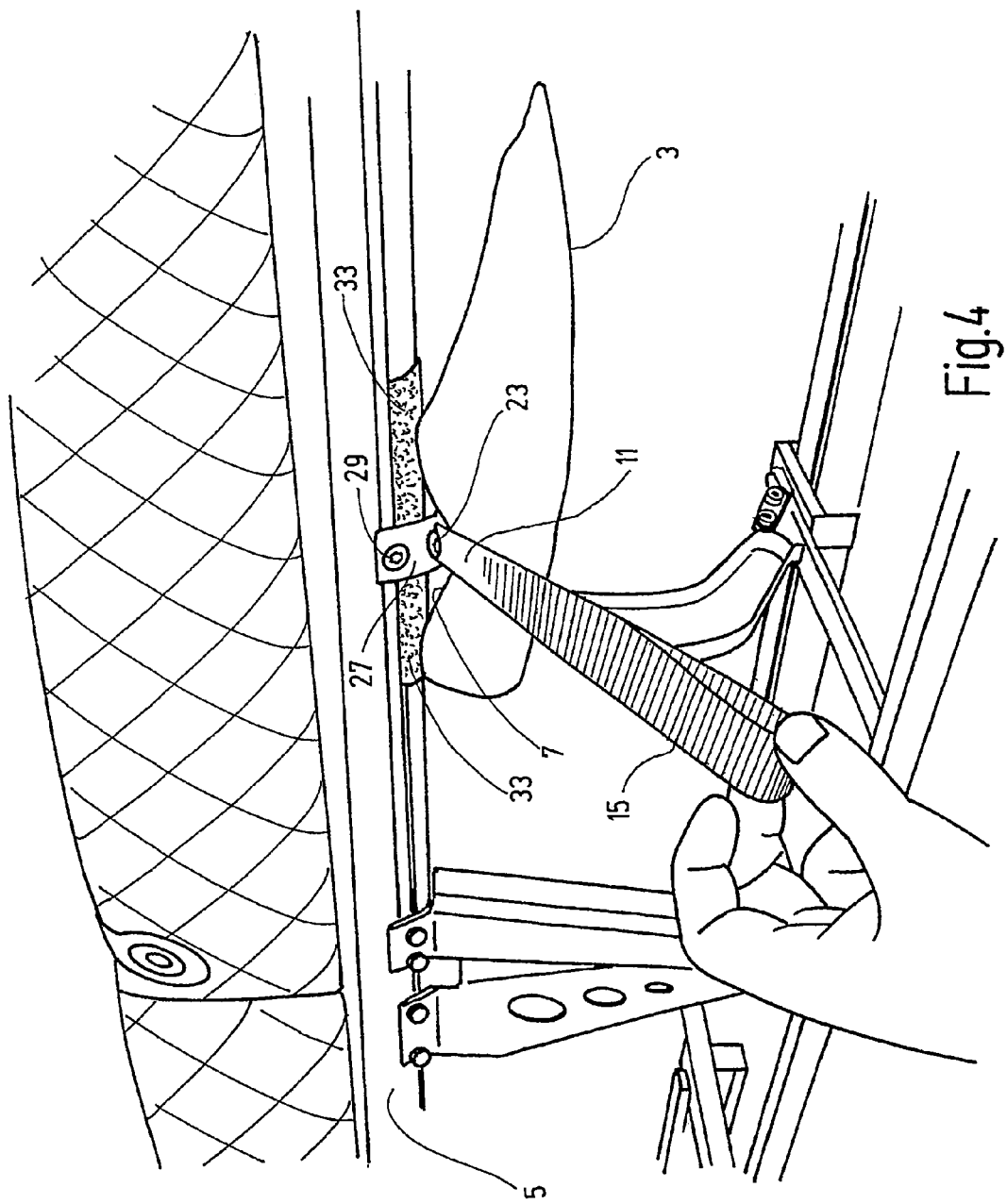
FIGS. 4 and 5 are highly simplified perspective views of the life jacket pouch of FIG. 2 in the closed state, the various directions of pull in the event of manual operation of the opening strip for the purpose of opening being illustrated.
Figure 5:
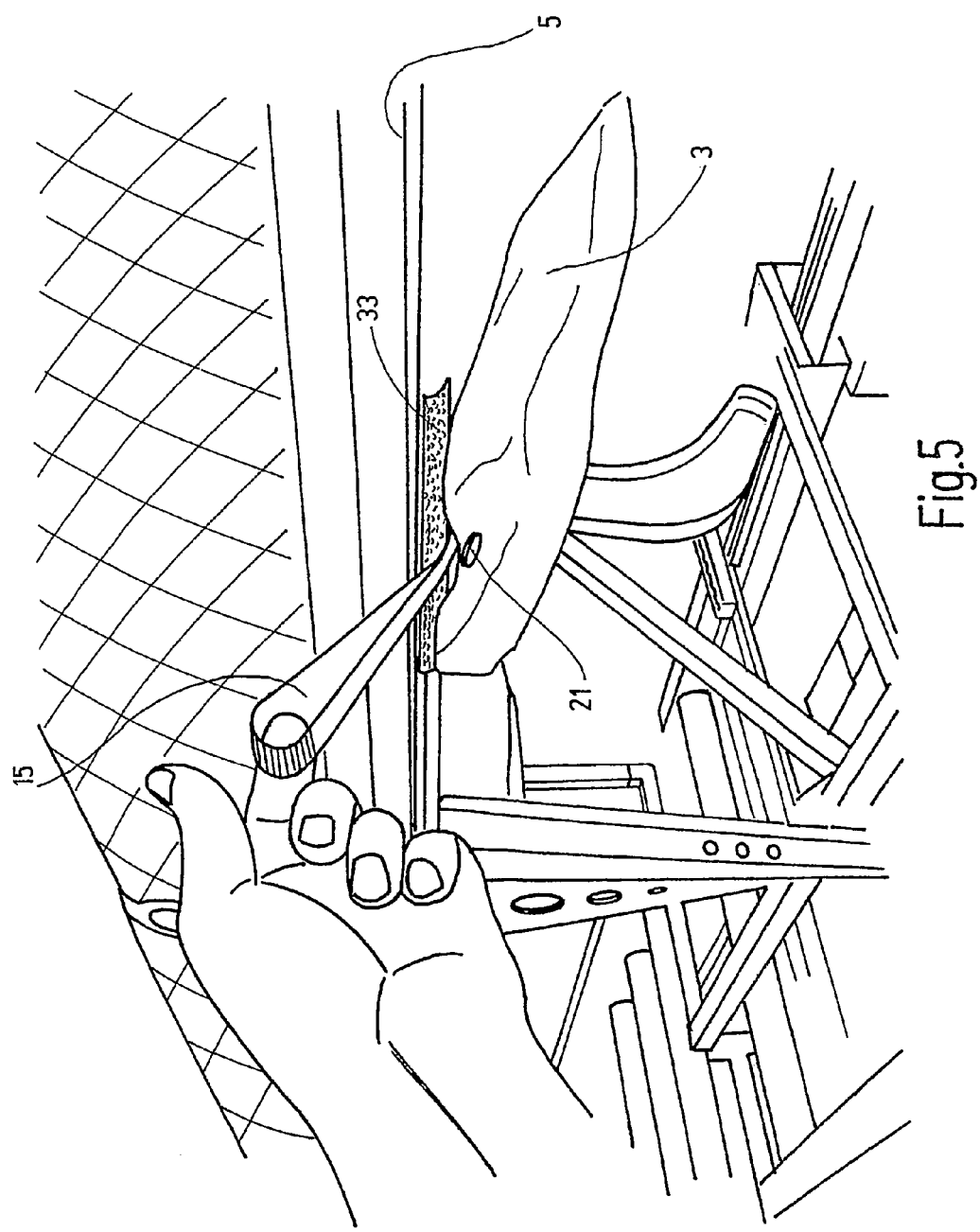

FIG. 2 illustrates a range of 90° of the angles of the directions of extraction in which the grip loop 15 of the opening strip 13 may be pulled to effect definite opening of the closure device of the pocket 3. The range of angles extends 45° above and 45° below the horizontal seat plane, designated as 45. FIGS. 4 and 5 illustrate manual operation of the grip loop 15 in the lower (FIG. 4) and upper (FIG. 5) portion of the range of angles. The seat passenger has available to him virtually any desired options for opening, so that the life jacket pouch may be opened rapidly in an emergency without concern for possible consequences.

While one embodiment has been chosen to illustrate the invention, it will be understood by those skilled in the art that various changes and modifications can be made therein without departing from the scope of the invention as defined in the appended claims.

What is claimed is:

1. An aircraft passenger seat, comprising:
   a seating surface;
   a forward spar extending in a direction transverse to a direction of the seat;
   a life jacket pocket located below said seating surface, said life jacket pocket including
      first and second wall elements movable relative to one another and having an opening edge along which said wall elements can be firmly and releasably fastened,
      closure means, adjacent said opening edge, for firmly and releasably fastening said wall elements along said opening edge, said closure means having at least one pair of retaining elements generating a closing force acting between said wall elements on said opening edge, said pair of retaining elements being a snap fastener having a first one-half element connected to said forward spar and a second one-half element affixed to said first wall element adjacent said opening edge and proximate said forward spar in a closed position of said pocket, and
      a manually operated opening strip for overcoming the closing force to open said pocket, said opening strip having a tie strip acting on said pair of retaining elements and having an opening through which said snap fastener extends; and
   a life jacket located in said pocket.

2. An aircraft passenger seat according to claim 1 wherein said first one-half element is movable connected to said forward spar.

3. An aircraft passenger seat according to claim 2 wherein said first one-half element is secured on a free end of a short, flexible strap segment suspended from said forward spar.

4. An aircraft passenger seat according to claim 3 wherein mating flat retaining elements are mounted on said forward spar on both sides of said flexible strap segment and on said second wall element for mounting said second wall element adjacent said opening edge below said forward spar.

5. An aircraft passenger seat according to claim 3 wherein said flexible strap segment is connected by a screw connection to said forward spar adjacent an end of said flexible strap segment opposite said first one-half element.

6. An aircraft passenger seat comprising:
a seating surface;
a life jacket pocket located below said seating surface said life jacket pocket including
  first and second wall elements movable relative to one another and having an opening edge along which said wall elements can be firmly and releasably fastened,
  closure means, adjacent said opening edge, for firmly and releasably fastening said wall elements along said opening edge, said closure means having at least one pair of retaining elements generating a closing force acting between said wall elements on said opening edge, said pair of retaining elements being a snap fastener said snap fastener, and
  a manually operated opening strip for overcoming the closing force to open said pocket, said opening strip having a tie strip acting on said pair of retaining elements and having an opening through which said snap fastener extends; and
a life jacket located in said pocket, said tie strip having a pull-out cord extending beyond said opening into an interior of said pocket and connected to said life jacket for extracting said life jacket from the seat.

* * * * *